(12) United States Patent
Kouno et al.

(10) Patent No.: US 10,451,154 B2
(45) Date of Patent: Oct. 22, 2019

(54) ELECTRIC ACTUATOR

(71) Applicant: DENSO CORPORATION, Kariya, Aichi-pref. (JP)

(72) Inventors: Naoaki Kouno, Kariya (JP); Hiroki Shimada, Kariya (JP); Tetsuji Yamanaka, Kariya (JP); Etsugo Yanagida, Kariya (JP)

(73) Assignee: DENSO CORPORATION, Kariya (JP)

( * ) Notice: Subject to any disclaimer, the term of this patent is extended or adjusted under 35 U.S.C. 154(b) by 89 days.

(21) Appl. No.: 15/736,440

(22) PCT Filed: Jun. 7, 2016

(86) PCT No.: PCT/JP2016/002749
§ 371 (c)(1),
(2) Date: Dec. 14, 2017

(87) PCT Pub. No.: WO2016/203734
PCT Pub. Date: Dec. 22, 2016

(65) Prior Publication Data
US 2018/0172120 A1 Jun. 21, 2018

(30) Foreign Application Priority Data

Jun. 18, 2015 (JP) .................................. 2015-123102

(51) Int. Cl.
*H02K 5/04* (2006.01)
*H02K 5/22* (2006.01)
(Continued)

(52) U.S. Cl.
CPC ......... *F16H 19/001* (2013.01); *F02B 37/186* (2013.01); *F16H 1/06* (2013.01);
(Continued)

(58) Field of Classification Search
CPC ........ F16H 19/001; F16H 57/031; F16H 1/06; F16H 57/021; F16H 57/032;
(Continued)

(56) References Cited

U.S. PATENT DOCUMENTS 3,308,315 A * 3/1967 Mahon ................. H02K 7/1185
310/41
4,352,036 A * 9/1982 Kuwako ................. H02K 21/38
310/83
(Continued)

FOREIGN PATENT DOCUMENTS

JP 2010-136587 6/2010
JP 2012-34532 2/2012
(Continued)

OTHER PUBLICATIONS

International Search Report of PCT/JP2016/002749, dated Jul. 12, 2016, 2 pages.

*Primary Examiner* — John K Kim
(74) *Attorney, Agent, or Firm* — Nixon & Vanderhye, P.C.

(57) ABSTRACT

Positioning of a cover relative to a housing is made at two locations. i.e., fitting between a first intermediate shaft and a first recess and fitting between a second intermediate shaft and a second recess. In this way, a load of the cover is not conducted to an output shaft through a cover-side bearing. Therefore, in a state where the cover is fixed to the housing, an excessively large load is not generated between a cover-side bearing and the output shaft and a housing-side bearing and the output shaft.

5 Claims, 9 Drawing Sheets

(51) Int. Cl.
*H02K 7/11* (2006.01)
*H02K 11/21* (2016.01)
*F16H 19/00* (2006.01)
*F16H 1/06* (2006.01)
*F16H 57/021* (2012.01)
*H02K 7/116* (2006.01)
*H02K 11/215* (2016.01)
*F02B 37/18* (2006.01)
*F16H 57/031* (2012.01)
*F16K 31/04* (2006.01)
*F16H 57/02* (2012.01)
*F16H 57/032* (2012.01)

(52) U.S. Cl.
CPC ......... *F16H 57/021* (2013.01); *F16H 57/031* (2013.01); *F16K 31/043* (2013.01); *H02K 5/04* (2013.01); *H02K 5/225* (2013.01); *H02K 7/116* (2013.01); *H02K 11/215* (2016.01); *F16H 57/032* (2013.01); *F16H 2057/02034* (2013.01); *F16H 2057/02082* (2013.01); *Y02T 10/144* (2013.01)

(58) Field of Classification Search
CPC .............................. F16H 2057/02034; F16H 2057/02082; H02K 5/225; H02K 5/04; H02K 11/215; H02K 7/116; F16K 31/043; F02B 37/186; Y02T 10/144
USPC ..................... 310/68 B, 83, 98, 99
See application file for complete search history.

(56) References Cited

U.S. PATENT DOCUMENTS

| | | | | |
|---|---|---|---|---|
| 4,410,818 | A * | 10/1983 | Omata | H02K 7/1185 310/164 |
| 4,893,038 | A * | 1/1990 | Miyzawa | H02K 7/1185 188/82.1 |
| 5,187,400 | A * | 2/1993 | Kurata | H02K 3/525 310/49.12 |
| 5,737,968 | A * | 4/1998 | Hardey | H02K 7/116 74/421 A |
| 5,880,551 | A * | 3/1999 | Prudham | G01R 7/06 310/156.43 |
| 6,509,661 | B1 * | 1/2003 | Kujira | H02K 5/225 310/71 |
| 6,670,731 | B2 * | 12/2003 | Kotani | H02K 1/141 310/156.01 |
| 2007/0022597 | A1 * | 2/2007 | Shimura | H02K 1/145 29/596 |
| 2008/0303364 | A1 * | 12/2008 | Ogawa | H02K 7/116 310/80 |
| 2010/0060092 | A1 * | 3/2010 | Blakesley | H02K 5/1677 310/83 |
| 2012/0255379 | A1 | 10/2012 | Lim et al. | |
| 2013/0140477 | A1 * | 6/2013 | Shimane | H02K 7/116 251/129.01 |
| 2017/0237312 | A1 * | 8/2017 | Stewart | H02K 11/215 310/68 B |
| 2018/0172120 | A1 * | 6/2018 | Kouno | F16H 1/06 |

FOREIGN PATENT DOCUMENTS

| | | |
|---|---|---|
| KR | 10-2011-0076735 | 7/2011 |
| KR | 10-1195824 | 11/2012 |
| WO | WO 2016/203733 | 12/2016 |
| WO | WO 2016/203735 | 12/2016 |
| WO | WO 2016/203736 | 12/2016 |

* cited by examiner (a)

(b)

(c)

ELECTRIC ACTUATOR

CROSS REFERENCE TO RELATED APPLICATION

This application is the U.S. national phase of International Application No. PCT/JP2016/002749 filed on Jun. 7, 2016, which designated the U.S. and claims priority to Japanese Patent Application No. 2015-123102 filed on Jun. 18, 2015, the entire contents of each of which are hereby incorporated by reference.

TECHNICAL FIELD

The present disclosure relates to an electric actuator that rotates an output shaft.

BACKGROUND ART

As an example of an electric actuator, which rotates the output shaft, a technique, which is disclosed in the patent literature 1, is known.

In the electric actuator of the patent literature 1, a rotational speed of a rotational output, which is generated by an electric motor, is reduced through a speed reducing gear device of a parallel shaft type, and the rotation of the reduced rotational speed is conducted to the output shaft to drive the same. The speed reducing gear device includes intermediate shafts, which are parallel to the output shaft. The intermediate shafts are supported by a housing.

One end of the output shaft is rotatably supported by a bearing (hereinafter referred to as a housing-side bearing) that is placed between the housing and the output shaft.

Furthermore, the other end of the output shaft is rotatably supported by a bearing (hereinafter referred to as a cover-side bearing) that is placed between a cover and the output shaft.

In the electric actuator of the patent literature 1, the output shaft and the intermediate shafts are used to position the cover relative to the housing.

Therefore, at the time assembling the cover to the housing, it is not possible to control a gap between the cover-side bearing and the output shaft and a gap between the housing-side bearing and the output shaft. Thus, in such a case, the cover may possibly be assembled to the housing in a state where the gap is absent between the cover-side bearing and the output shaft and also between the housing-side bearing and the output shaft. Thereby, the cover may be fixed to the housing in a state where an excessively large load is applied to the output shaft.

In the state where the cover-side bearing is urged against the output shaft with the excessively large load, and the housing-side bearing is urged against the output shaft with the excessively large load, when the output shaft is rotated, damage, such as wearing, may possibly occur at the cover-side bearing, the housing-side bearing and the output shaft. Specifically, malfunctioning of the electric actuator and generation of a noise may possibly occur.

CITATION LIST

Patent Literature

PATENT LITERATURE 1: KR2011-0076735A (corresponding to US2012/0255379A1)

SUMMARY OF INVENTION

It is an objective of the present disclosure to provide an electric actuator that does not generate an excessively large load between a cover-side bearing and an output shaft and a housing-side bearing and the output shaft in a state where the cover is fixed to the housing.

In order to achieve the above objective, according to the present disclosure, there is provided an electric actuator that includes an electric motor, a housing, a speed reducing gear device of a parallel shaft type, an output shaft, a cover, a housing-side bearing, and a cover-side bearing. The electric motor converts an electric power into a rotational output. The electric motor is fixed in the housing. The speed reducing gear device reduces a rotational speed of the rotational output generated by the electric motor. The output shaft is driven by the rotational output, the rotational speed of which is reduced by the speed reducing gear device. The cover is assembled to the housing and forms a space between the cover and the housing to receive the electric motor and the speed reducing gear device. The housing-side bearing is placed between the housing and the output shaft and rotatably supports the output shaft relative to the housing. The cover-side bearing is placed between the cover and the output shaft and rotatably supports the output shaft relative to the cover. The speed reducing gear device includes a plurality of intermediate shafts that are parallel to the output shaft. One end portion of each of the plurality of intermediate shafts is fixed to the housing, and another end portion of each of the plurality of intermediate shafts is fitted into a corresponding one of a plurality of recesses formed at the cover. The cover is positioned relative to the housing by fitting the another end portions of the plurality of intermediate shafts into the plurality of recesses, respectively.

In the above structure, the cover is positioned relative to the housing by fitting the intermediate shafts to the recesses formed at the cover.

Therefore, the output shaft is not used to position the cover. As a result, the load, which is exerted at the time of positioning the cover, is not applied to the output shaft. Thus, in the state where the cover is fixed to the housing, the excessive load is not generated between the cover-side bearing and the output shaft as well as the housing-side bearing and the output shaft.

DESCRIPTION OF EMBODIMENTS

Figure 1:
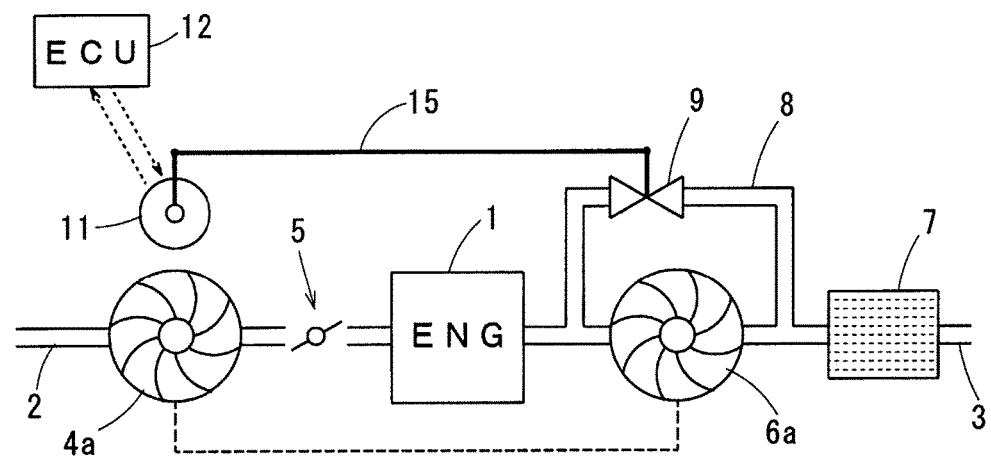
FIG. 1 is a schematic diagram of an engine intake and exhaust system according to an embodiment of the present disclosure.
Figure 2:
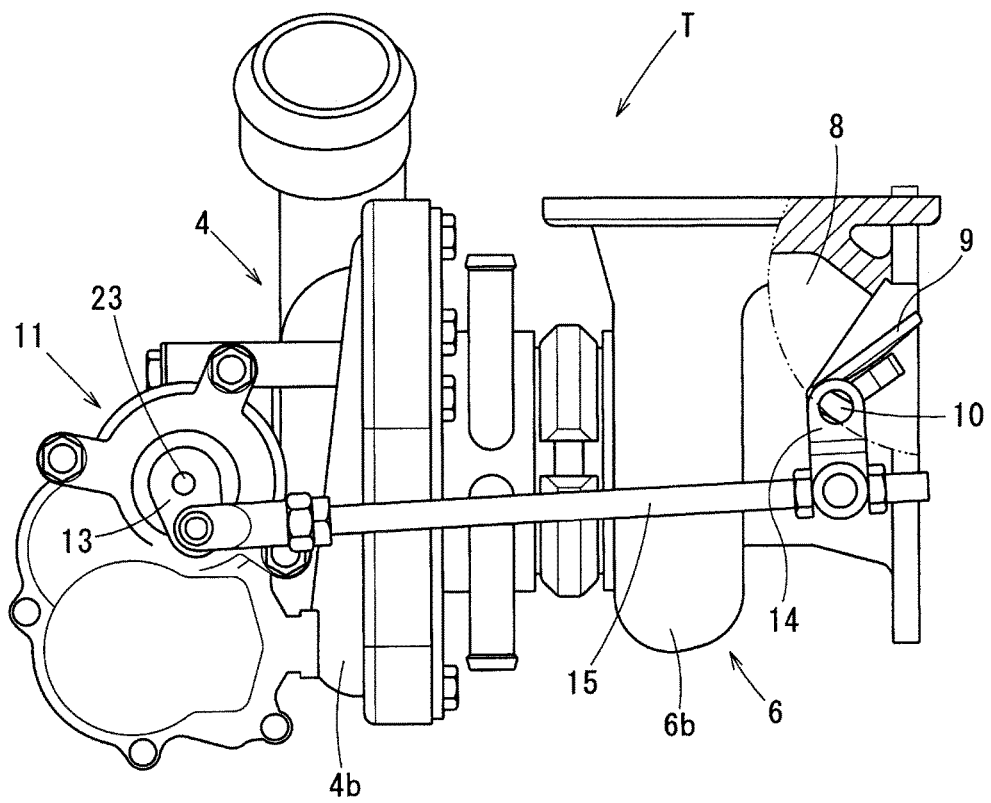
FIG. 2 is a descriptive view of a turbocharger according to the embodiment of the present disclosure.
Figure 3:
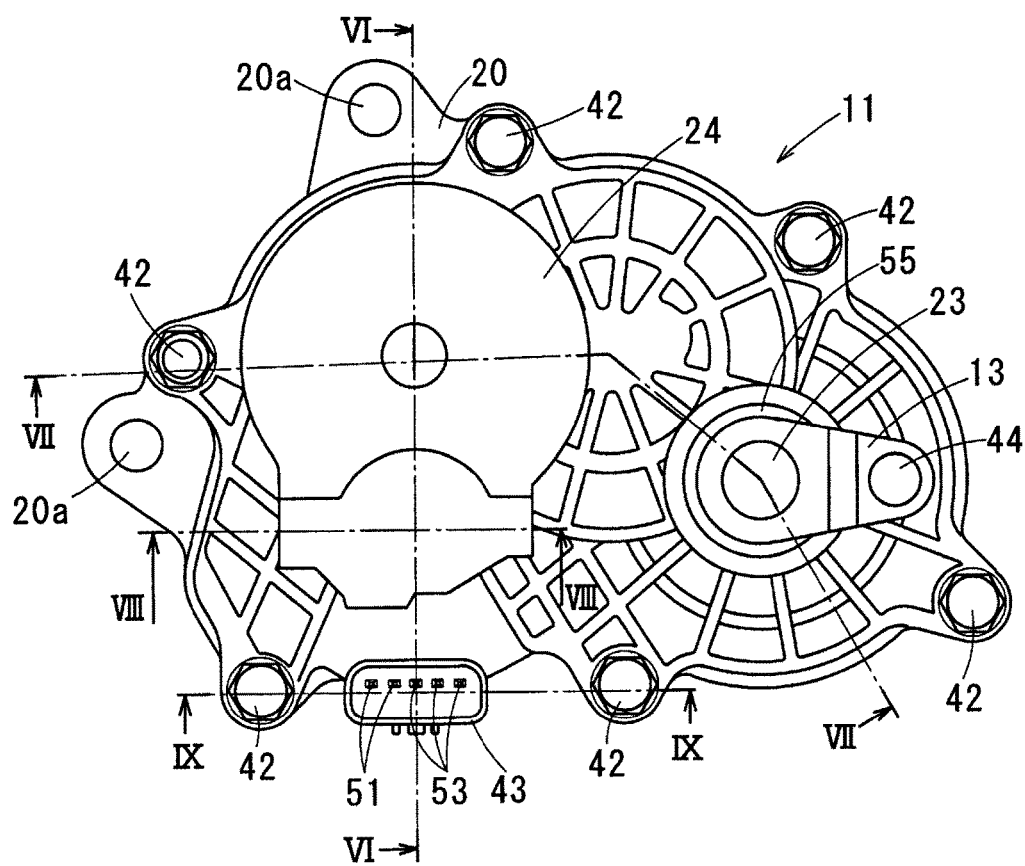
FIG. 3 is a top view of an electric actuator according to the embodiment of the present disclosure.
Figure 4:
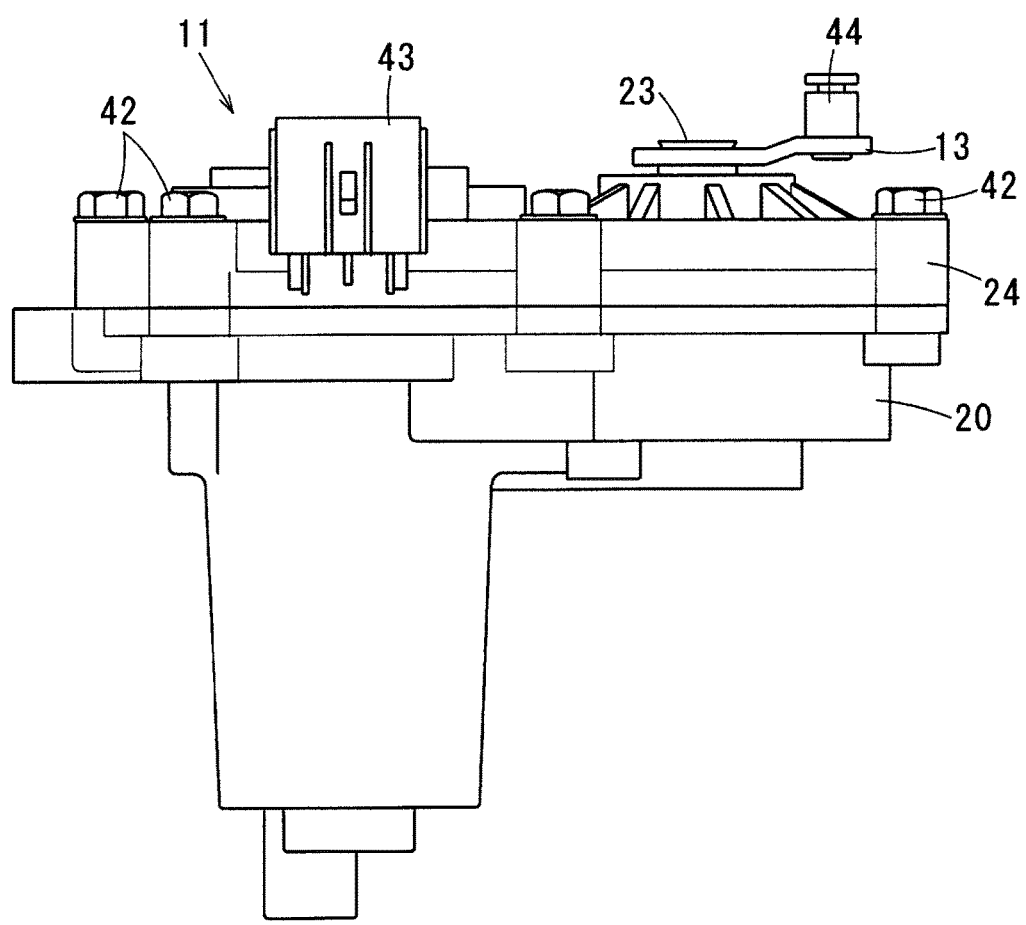
FIG. 4 is a side view of the electric actuator according to the embodiment of the present disclosure.
Figure 5:
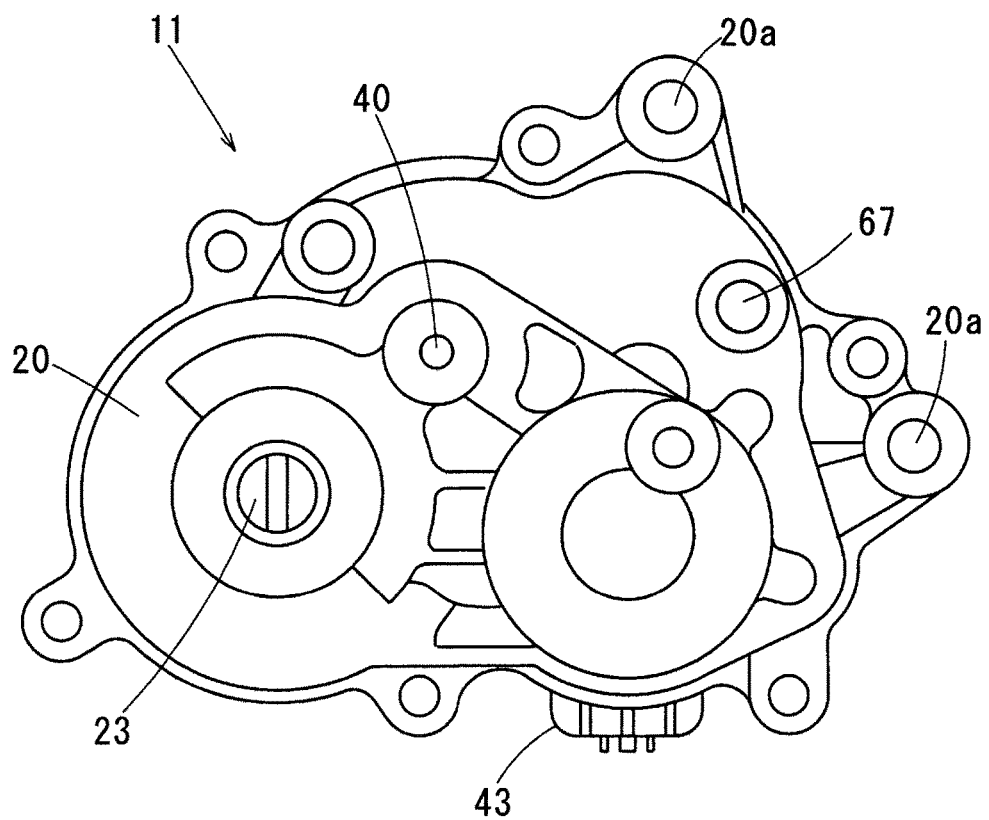
FIG. 5 is a bottom view of the electric actuator according to the embodiment of the present disclosure.
Figure 6:
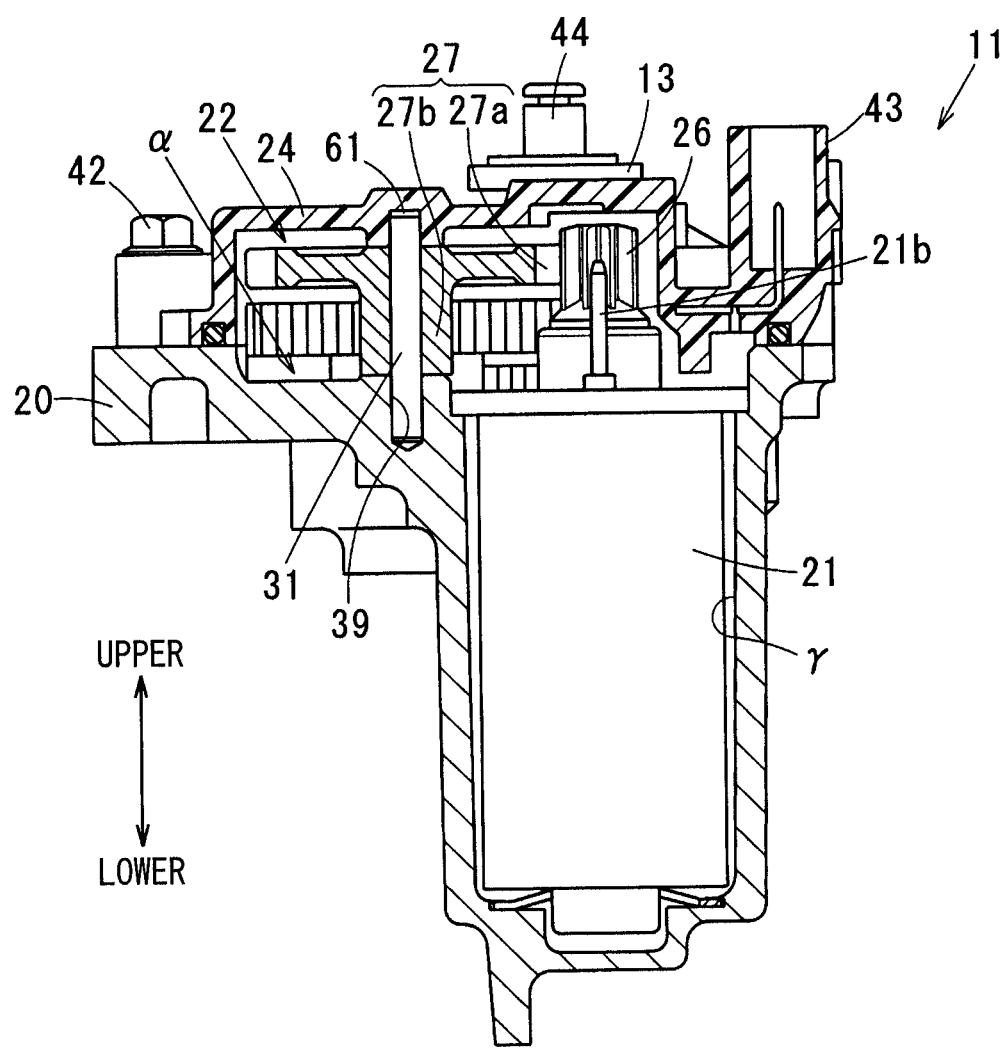
FIG. 6 is a cross-sectional view taken along line VI-VI in FIG. 3.
Figure 7:
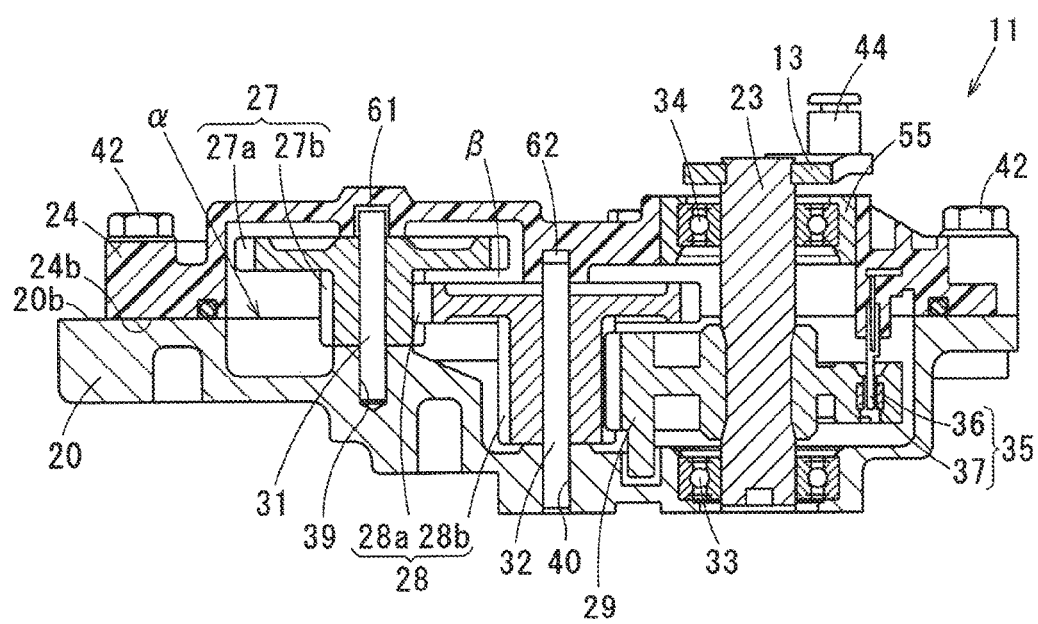
FIG. 7 is a cross-sectional view taken along line VII-VII in FIG. 3.
Figure 8:
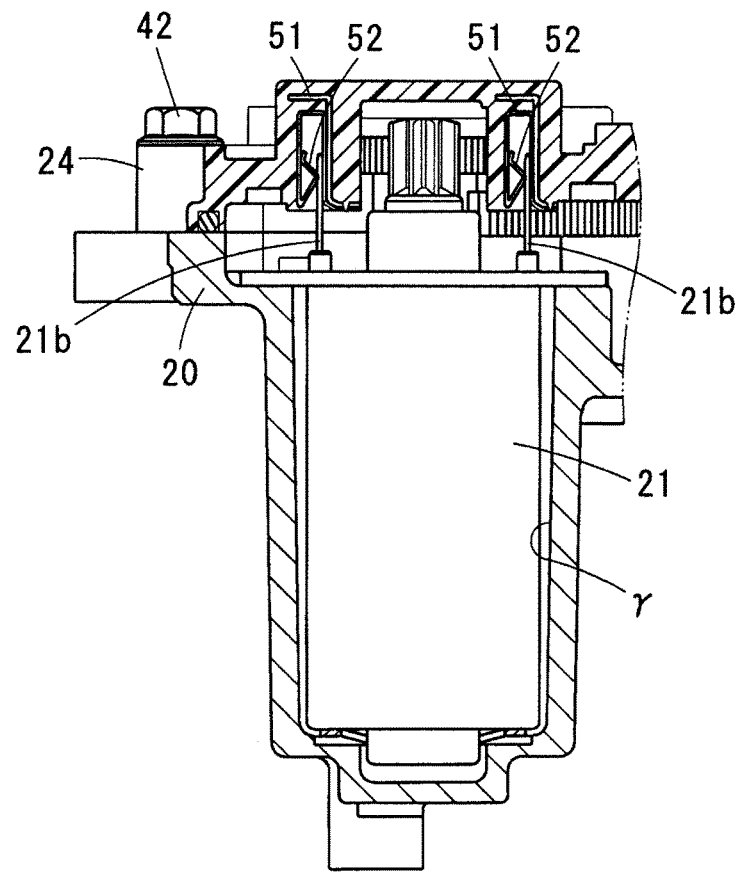
FIG. 8 is a cross-sectional view taken along line VIII-VIII in FIG. 3.
Figure 9:
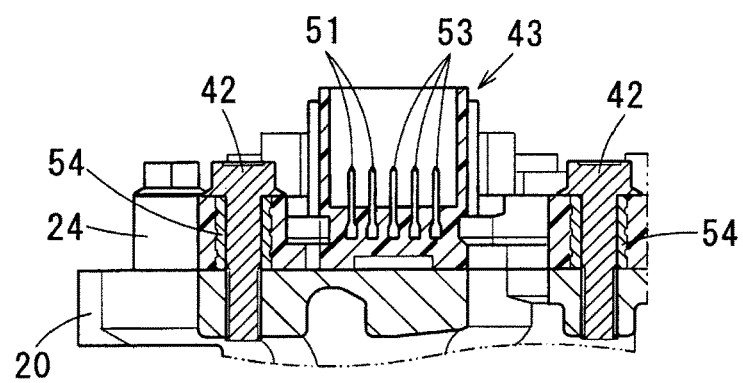
FIG. 9 is a cross-sectional view taken along line IX-IX in FIG. 3.

Hereinafter, embodiments of the present disclosure will be described with reference to the drawings. The following embodiments merely disclose one example, and it should be understood that the present disclosure should not be limited to the embodiment.

First Embodiment

A first embodiment will be described with reference to FIGS. 1 to 12(c).

An engine 1, which is installed in a vehicle and drives the vehicle, has an intake passage 2, which guides intake air to cylinders of the engine 1, and an exhaust passage 3, which discharges exhaust gas generated in the cylinders to the atmosphere.

An intake air compressor 4 of a turbocharger T and a throttle valve 5 for adjusting the amount of intake air supplied to the engine 1 are installed to the middle of the intake passage 2.

An exhaust gas turbine 6 of the turbocharger T and a catalyst 7 for purifying the exhaust gas are installed to the middle of the exhaust passage 3. The catalyst 7 is a known three-way catalyst having a monolithic structure. The catalyst 7 purifies noxious components contained in the exhaust gas through chemical oxidation and chemical reduction upon increasing of the temperature of the catalyst 7 to an activation temperature.

The exhaust gas turbine 6 includes: a turbine wheel 6a, which is rotated by the exhaust gas discharged from the engine 1; and a turbine housing 6b, which is shaped into a vortex form and receives the turbine wheel 6a.

The intake air compressor 4 includes: a compressor wheel 4a, which is rotated by a rotational output of the turbine wheel 6a upon receiving the same; and a compressor housing 4b, which is shaped into a vortex form and receives the compressor wheel 4a.

A bypass passage 8, which conducts the exhaust gas while bypassing the turbine wheel 6a, is formed at the turbine housing 6b.

The bypass passage 8 directly guides the exhaust gas, which flows into the turbine housing 6b, to an exhaust gas outlet of the turbine housing 6b. This bypass passage 8 is configured to be openable and closable by a wastegate valve 9.

The wastegate valve 9 is a swing valve that is rotatably supported in an inside of the turbine housing 6b. Specifically, the wastegate valve 9 is rotated through a valve shaft 10 that is supported such that the valve shaft 10 is rotatable relative to the turbine housing 6b.

The wastegate valve 9 adjusts an opening degree of the bypass passage 8 to control a boost pressure generated by the turbocharger T at the time of operating the engine 1 at, for example, a high rotational speed.

Furthermore, the wastegate valve 9 fully opens the bypass passage 8 to warm up the catalyst 7 when the temperature of the catalyst 7 has not yet reached the activation temperature at the time of, for example, immediately after cold start of the engine 1. In this way, the high temperature exhaust gas, from which the heat is not taken by the turbine wheel 6a, can be guided to the catalyst 7, so that the rapid warm-up of the catalyst 7 can be executed.

The turbocharger T includes an electric actuator 11 as a means for rotating the wastegate valve 9. An ECU 12, which executes an engine control operation, controls energization of the electric actuator 11.

The electric actuator 11 is installed to the intake air compressor 4, which is remote from the exhaust gas turbine 6, for the purpose of avoiding an influence of the heat of the exhaust gas. As discussed above, the electric actuator 11 is installed at the location that is remote from the wastegate valve 9. Therefore, the turbocharger T has a link mechanism that conducts an output of the electric actuator 11 to the wastegate valve 9.

The link mechanism is a so-called four-bar linkage and includes: an actuator lever 13 that is rotated by the electric actuator 11; a valve lever 14 that is coupled to the valve shaft 10; and a rod 15 that conducts a rotational torque, which is applied to the actuator lever 13, to the valve lever 14.

Now, the electric actuator 11 will be described.

The electric actuator 11 includes: a housing 20 that is installed to the intake air compressor 4; an electric motor 21 that is installed in the housing 20; a speed reducing gear device 22; an output shaft 23; a cover 24; and an actuator lever 13 that is fixed to a distal end part of the output shaft 23.

The housing 20 has an opening portion a that opens toward one side.

Hereinafter, for the descriptive purpose, a direction, in which the opening portion a opens, will be referred to as "upper", and an opposite direction will be referred to as "lower". This upper-to-lower direction should not limit an installation direction. Here, reference sign 20a shown in FIG. 3 indicates bolt insertion holes that are used at the time of assembling the electric actuator 11 to the intake air compressor 4.

The housing 20 is a die-cast product made of, for example, aluminum. The cover 24 is installed to an upper portion of the housing 20.

The electric motor 21 and the speed reducing gear device 22 are placed in a space β that is formed between the housing 20 and the cover 24.

The electric motor 21 converts an electric power to a rotational output and is installed in the housing 20. Specifically, the electric motor 21 is inserted into a motor insertion chamber y, which is formed in the housing 20, and thereafter the electric motor 21 is fixed to the housing 20 with, for example, screws. The electric motor 21 is not necessarily limited to any particular type and may be, for example, a known direct current electric motor or a known stepping motor.

The speed reducing gear device 22 is installed in the housing 20. This speed reducing gear device 22 is a parallel shaft type that has three or more speed reducing stages for reducing the rotational speed of the rotational output generated by the electric motor 21.

Specifically, the speed reducing gear device 22 of the present embodiment has three speed reducing stages and includes: a pinion gear 26 that is driven by the electric motor 21; a first intermediate gear 27 that is rotated by the pinion gear 26; a second intermediate gear 28 that is rotated by the first intermediate gear 27; and a final gear 29 that is rotated by the second intermediate gear 28.

The pinion gear 26 is an external gear that has a small diameter and is fixed to the rotatable shaft of the electric motor 21.

The first intermediate gear 27 is a double gear that includes a first large diameter gear 27a and a first small diameter gear 27b, which are coaxial. The first intermediate gear 27 is rotatably supported by a first intermediate shaft 31 that is fixed to the housing 20. The pinion gear 26 and the first large diameter gear 27a are meshed with each other to form a first speed reducing stage. In the present embodiment, press fitting is used as a fixing technique for fixing the first intermediate shaft 31 to the housing 20.

Similar to the first intermediate gear 27, the second intermediate gear 28 is a double gear that includes a second large diameter gear 28a and a second small diameter gear 28b, which are coaxial. The second intermediate gear 28 is rotatably supported by a second intermediate shaft 32 that is fixed to the housing 20. The first small diameter gear 27b and the second large diameter gear 28a are meshed with each other to form a second speed reducing stage. In the present embodiment, press fitting is used as a fixing technique for fixing the second intermediate shaft 32 to the housing 20.

The final gear 29 is an external gear that has a large diameter and is fixed to the output shaft 23. The final gear 29 is formed only in a predetermined rotational range. The second small diameter gear 28b and the final gear 29 are meshed with each other to form a third speed reducing stage.

As discussed above, the final gear 29 is installed to the output shaft 23. Therefore, the output shaft 23 is driven by the rotational output that has the reduced rotational speed, which is reduced by the speed reducing gear device 22.

The cover 24 is assembled to the housing 20. As discussed above, the space β, which receives the electric motor 21 and the speed reducing gear device 22, is formed between the housing 20 and the cover 24. An upper portion of the output shaft 23 extends through the cover 24, so that an upper end part of the output shaft 23 is exposed to the outside of the cover 24.

The cover 24 is made of a resin material. The resin material of the cover 24 is used to insert mold motor terminals 51 that supply an electric power to the electric motor 21, and the resin material of the cover 24 forms the connector 43 to be connected with an external device.

Specifically, relay terminals 52, which are connected to power supply terminals 21b of the electric motor 21 to make an electrical connection therewith; a base end part of the magnetic sensing device 37; sensor terminals 53, which are electrically connected to the magnetic sensing device 37; a plurality of collars 54, which are made of metal and respectively receive the bolts 42 for fixing the cover 24 to the housing 20; and a bearing holder 55, which is made of metal and receives a cover-side bearing 34 press fitted thereto, are insert-molded at the cover 24 besides the motor terminals 51.

The actuator lever 13 is fixed to the upper end part of the output shaft 23, which is exposed to the upper side of the cover 24. Although a fixing technique for fixing the output shaft 23 and the actuator lever 13 together should not be limited any particular one, crimping or welding is used to fix between the output shaft 23 and the actuator lever 13.

A pin 44, which is parallel to the output shaft 23, is installed to a rotating end part of the actuator lever 13. The pin 44 is a component that is rotatably connected to an end part of the rod 15 and conducts the rotational torque of the actuator lever 13 to the rod 15.

The electric actuator 11 includes a rotational angle sensor 35. The rotational angle sensor 35 senses a rotational angle of the output shaft 23, and thereby the rotational angle sensor 35 senses an opening degree of the wastegate valve 9.

The rotational angle sensor 35 is a contactless type and includes: a magnetic flux generating portion 36, which is rotated integrally with the output shaft 23; and a magnetic sensing device 37, which is installed to one of the cover 24 or the housing 20 and senses a magnetic flux generated from the magnetic flux generating portion 36. The rotational angle of the output shaft 23, which is sensed with the rotational angle sensor 35, is outputted to the ECU 12. Details of the rotational angle sensor 35 will be described later.

The ECU 12 is an engine control unit having a microcomputer and includes a control program for controlling energization of the electric actuator 11.

Specifically, the ECU 12 computes a target opening degree of the wastegate valve 9 that is suitable for an operational state of the engine 1 based on the operational state of the engine 1. Then, the ECU 12 executes a feedback control operation of the electric actuator 11 such that the sensed opening degree, which is sensed through the rotational angle sensor 35, coincides with the computed target opening degree. This boost pressure control operation is only one example, and the present disclosure should not be limited to this boost pressure control operation.

Furthermore, the ECU 12 executes the rapid warm-up of the catalyst 7 when the actual temperature or the predicted temperature of the catalyst 7 has not yet reached the activation temperature at the time of, for example, immediately after the cold start of the engine. Specifically, at the time of executing the rapid warm-up of the catalyst 7, the ECU 12 sets the opening degree of the wastegate valve 9 to a predetermined opening degree. As a result, it is possible to limit the heat of the exhaust gas from being taken away by the wastegate valve 9. This rapid warm-up control operation of the catalyst 7 is only one example, and the present disclosure should not be limited to this rapid warm-up control operation of the catalyst 7.

(First Characteristic Technique)

Hereinafter, an extending direction of each of an axis of the output shaft 23, an axis of the first intermediate shaft 31, and an axis of the second intermediate shaft 32 will be referred to as an axial direction.

The housing 20 includes a housing end surface 20b, which contacts the cover 24. The housing end surface 20b is a planar surface that is perpendicular to the axial direction.

Similarly, the cover 24 has a cover end surface 24b, which contacts the housing 20. The cover end surface 24b is also formed as a planar surface that is perpendicular to the axial direction.

The cover 24 is positioned relative to the housing 20. In the state where the cover 24 is positioned relative to the housing 20, the cover 24 is fixed to the housing 20 with a plurality of bolts 42.

Hereinafter, a positioning structure for positioning the cover 24 relative to the housing 20 will be described.

A housing-side bearing 33, which rotatably supports the output shaft 23 relative to the housing 20, is placed between the housing 20 and the output shaft 23.

Furthermore, the cover-side bearing 34, which rotatably supports the output shaft 23 relative to the cover 24, is placed between the cover 24 and the output shaft 23.

The housing-side bearing 33 and the cover-side bearing 34 may be a rolling bearing (e.g., a ball bearing or a roller bearing) or a plain bearing (e.g., a metal bearing). In the present embodiment, the ball bearing is used as the housing-side bearing 33 and the cover-side bearing 34. This ball bearing has a known structure that includes a rubber seal. Specifically, the ball bearing has a structure that includes a plurality of balls placed between an outer race and an inner race.

An outer peripheral surface of the housing-side bearing 33 is press fitted to the housing 20. Furthermore, a lower side of the output shaft 23 is press fitted to an inner peripheral surface of the housing-side bearing 33.

An outer peripheral surface of the cover-side bearing 34 is press fitted to the cover 24. Specifically, the cover 24 is made of a resin material. Therefore, a bearing holder 55, which is made of metal, is insert-molded in the cover 24 to press fit the cover-side bearing 34. The outer peripheral surface of the cover-side bearing 34 is press fitted to the bearing holder 55. Furthermore, an upper side of the output shaft 23 is press fitted to an inner peripheral surface of the cover-side bearing 34.

With this construction, the output shaft 23 is rotatably supported.

The speed reducing gear device 22 includes the first intermediate shaft 31 and the second intermediate shaft 32, which are parallel with the output shaft 23.

A lower end part of the first intermediate shaft 31 is press fitted to the housing 20. Similarly, a lower end part of the second intermediate shaft 32 is press fitted to the housing 20. Specifically, the first intermediate shaft 31 and the second intermediate shaft 32 are respectively press fitted into a first press fitting hole 39 and a second press fitting hole 40, which are formed at an inside bottom surface of the opening portion α.

An upper end part of the first intermediate shaft 31 is fitted into an inside of a first recess 61 that is formed at the cover 24. Similarly, an upper part of the second intermediate shaft 32 is fitting into an inside of a second recess 62 that is formed at the cover 24. The first recess 61 and the second recess 62 are recesses that are formed at a lower surface of the cover 24 and are opened toward the lower side. The first recess 61 and the second recess 62 are formed simultaneously at the time of molding the cover 24.

Positioning of the cover 24 relative to the housing 20 is made by fitting the other end parts of the intermediate shafts into the recesses.

Specifically, the positioning of the cover 24 relative to the housing 20 is made at two locations, i.e., fitting between the first intermediate shaft 31 and the first recess 61, and fitting between the second intermediate shaft 32 and the second recess 62.

Hereinafter, the fitting between the first intermediate shaft 31 and the first recess 61 will be referred to as first fitting, and the fitting between the second intermediate shaft 32 and the second recess 62 will be referred to as second fitting.

In the state where the first fitting and the second fitting are made, a slidable range, in which the housing end surface 20b and the cover end surface 24b can be slid relative to each other, is limited by the first fitting and the second fitting.

In the state where the first fitting and the second fitting are made, a load of the cover 24 is not applied to the output shaft 23 even when the cover end surface 24b is slid in any direction relative to the housing end surface 20b. That is, in the present embodiment, a clearance x, which limits conduction of the assembling load of the cover 24 to the output shaft 23, is formed.

Like in the present embodiment, in the case where the cover-side bearing 34 is the ball bearing, the clearance x is formed between the outer race and the inner race.

Figure 10:
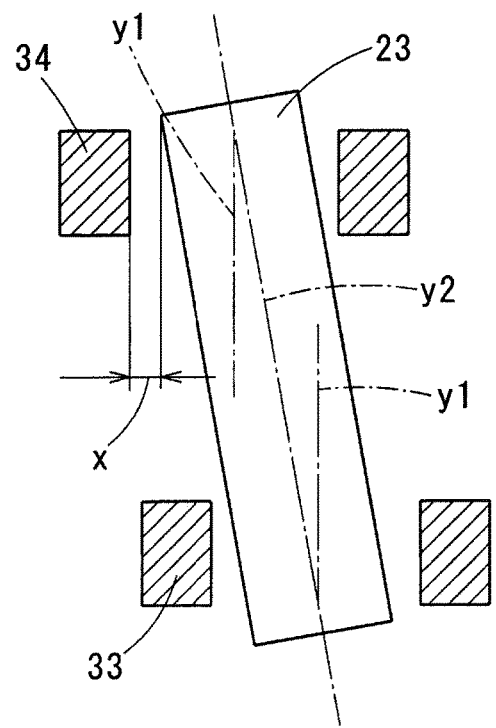
FIG. 10 is a descriptive view for describing an allowable clearance.

Furthermore, unlike the present embodiment, in the case where the cover-side bearing 34 is the metal bearing, the clearance x is formed between the cover-side bearing 34 and the output shaft 23, as shown in FIG. 10.

FIG. 10 shows a state where the output shaft 23 is tilted due to an assembling misalignment of the cover 24 relative to the housing 20, i.e., an assembling misalignment between the housing-side bearing 33 and the cover-side bearing 34 in the radial direction. A dot-dash line y1 shown in FIG. 10 indicates the axial direction of the output shaft 23 in a case where the output shaft 23 is assembled to the housing 20 while the output shaft 23 is not tilted. Furthermore, a dot-dash line y2 shown in FIG. 10 indicates the axial direction of the output shaft 23 in the tilted state.

(Advantages)

In the present embodiment, as discussed above, the positioning of the cover 24 relative to the housing 20 is made through the fitting between the first intermediate shaft 31 and the first recess 61 and the fitting between the second intermediate shaft 32 and the second recess 62.

In this way, in the state where the cover 24 is fixed to the housing 20, it is possible to limit conduction of the load, which is exerted at the time of assembling the cover 24, to the output shaft 23 through the cover-side bearing 34 and the housing-side bearing 33. That is, the positioning between the cover 24 and the housing 20 can be made such that there is established a relationship of: clearance x>0 (zero).

Here, even in a case where the clearance x=0 (zero), it is possible to limit the load, which is conducted to the output shaft 23 through the cover-side bearing 34 and the housing-side bearing 33, to be equal to or lower than an allowable load. Therefore, it is acceptable to have the relationship of: clearance x≥0 (zero).

As discussed above, in the state where the cover 24 is fixed to the housing 20, an excessive load is not generated between the cover-side bearing 34 and the output shaft 23 and also between the housing-side bearing 33 and the output shaft 23.

(Second Characteristic Technique)

The positioning of the cover 24 relative to the housing 20 is made by using the closest intermediate shaft, which is closest to the output shaft 23 among the multiple intermediate shafts.

That is, in the present embodiment, the second intermediate shaft 32 is used for the positioning.

(Advantages)

As discussed above, when the positioning of the cover 24 is made through use of the second intermediate shaft 32, which is closest to the output shaft 23, the assembling accuracy of the cover-side bearing 34 relative to the output shaft 23 can be improved.

(Third Characteristic Technique)

In the present embodiment, a circular hole is formed at one of the first recess 61 or the second recess 62. Furthermore, an elongated hole is formed at the other one of the first recess 61 or the second recess 62.

Figure 11:
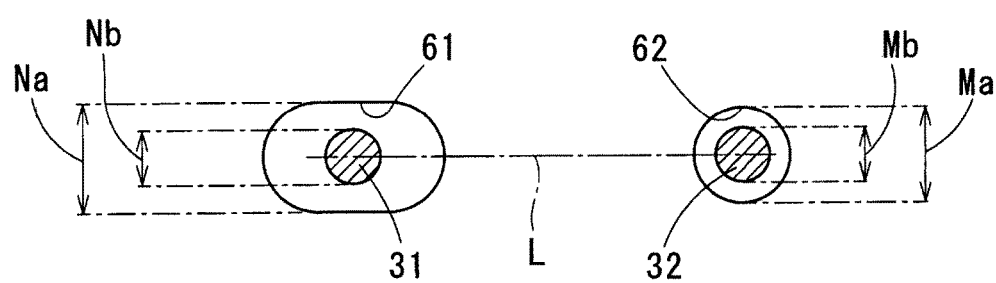
FIG. 11 is a descriptive view for describing recesses formed at a cover.
Figure 12:
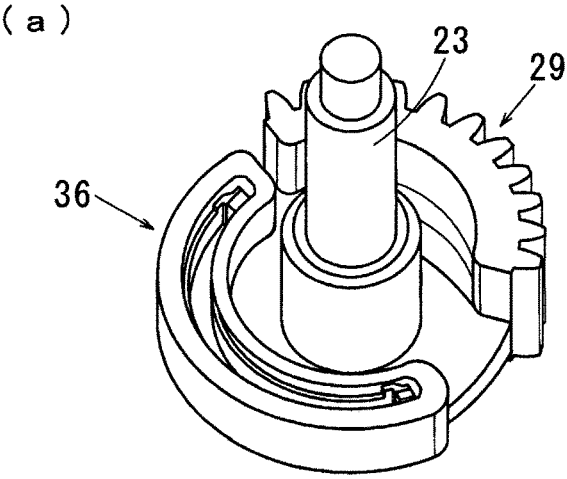
FIG. 12(a) is a perspective view of an output shaft, to which a resin component forming a final gear is fixed.
FIG. 12(b) is a perspective view of a magnetic flux generating portion to be insert-molded in the resin component.
FIG. 12(c) is a view of the output shaft taken in an axial direction.
Figure 12:
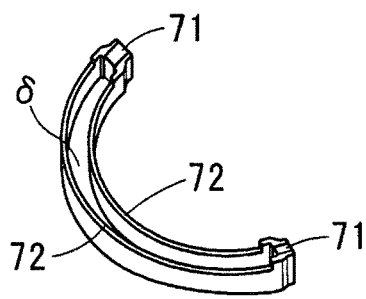
Figure 12:
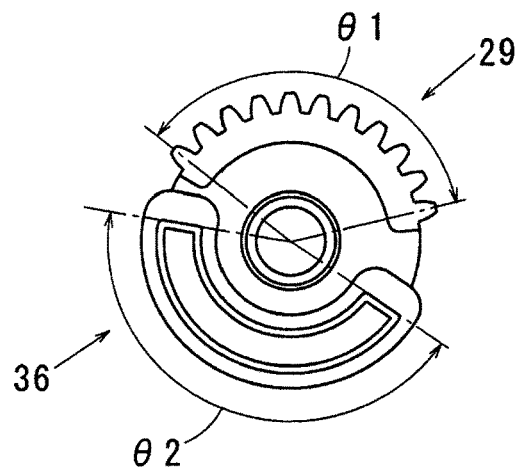

Then, as shown in FIG. 11, a longitudinal direction of the elongated hole (see the first recess 61) is along a straight line L that extends from the elongated hole to the circular hole (see the second recess 62).

The circular hole and the elongated hole refer to the hole shape of the first recess 61 and the hole shape of the second recess 62 at the time of viewing the cover 24 from the lower surface side of the cover 24. Specifically, the circular hole refers to a hole shape of a true circle. Furthermore, the elongated hole refers to a hole shape that is formed by connecting ends of two arcs, which are produced by bisecting a true circle, through two parallel straight lines.

An inner diameter Ma of the circular hole is set to be larger than an outer diameter Mb of the intermediate shaft, which is fitted into this circular hole. Specifically, in this embodiment, the intermediate shaft, which is fitted into the circular hole, is the second intermediate shaft 32. Therefore, the inner diameter Ma of the circular hole is set to be slightly larger than the outer diameter Mb of the second intermediate shaft 32.

In contrast, the inner diameter Na of the elongated hole, which is measured in a direction perpendicular to the longitudinal direction of the elongated hole, is set to be slightly larger than an outer diameter Nb of the intermediate shaft, which is fitted into this elongated hole. Specifically, in this embodiment, the intermediate shaft, which is fitted into the elongated hole, is the first intermediate shaft 31. Therefore, the inner diameter Na of the elongated hole, which is measured in the direction perpendicular to the longitudinal direction of the elongated hole, is set to be slightly larger than the outer diameter Nb of the first intermediate shaft 31.

(Advantages)

A reference position of the cover 24 relative to the housing 20 is limited by the circular hole. Furthermore, the position of the cover 24 in the rotational direction of the cover 24 about the circular hole is limited by the elongated hole. As discussed above, the elongated hole only limits the position in the rotational direction. Therefore, a tolerance in the longitudinal direction of the elongated hole can be increased.

(Fourth Characteristic Technique)

The circular hole is formed at the recess, which is closest to the output shaft 23 among the multiple intermediate shafts.

Specifically, the circular hole is formed at the second recess 62, and the elongated hole is formed at the first recess 61.

(Advantages)

As discussed above, the reference position of the cover 24 relative to the housing 20 is limited by the second recess 62, which is closest to the output shaft 23, so that the assembling accuracy of the cover-side bearing 34 relative to the output shaft 23 can be improved.

(Fifth Characteristic Technique)

The electric actuator 11 includes the rotational angle sensor 35 that senses the rotational angle of the output shaft 23.

The rotational angle sensor 35 includes: the magnetic flux generating portion 36, which is rotated integrally with the output shaft 23; and the magnetic sensing device 37, which is installed to one of the cover 24 or the housing 20 and senses the magnetic flux generated from the magnetic flux generating portion 36. In this embodiment, there is described the example where the magnetic sensing device 37 is installed to the cover 24.

A gear range θ1, in which the final gear 29 of the speed reducing gear device 22 is placed, and a sensing range θ2, in which the magnetic flux generating portion 36 is placed, exist separately from each other around the output shaft 23. That is, the gear range θ1 and the sensing range θ2 are set such that the gear range θ1 and the sensing range θ2 do not overlap with each other in the view taken in the axial direction of the output shaft 23.

(Advantages)

In a case where mechanical lock occurs at the electric actuator 11, the abnormality can be sensed with the rotational angle sensor 35.

The opening degree of the wastegate valve can be obtained based on the rotational angle of the output shaft 23, which is sensed with the rotational angle sensor 35.

The rotational angle sensor 35 is placed at a location which is displaced from the axis of the output shaft 23. In this way, it is not required to place the rotational angle sensor 35 at a shaft end of the output shaft 23. Thereby, a size of the electric actuator 11, which is measured in the axial direction, can be reduced.

Specifically, in the present embodiment, a rotational space, in which the final gear 29 is not formed, is used to place the magnetic flux generating portion 36. Thereby, the size of the electric actuator 11 can be reduced. By reducing the size of the electric actuator 11, the installability of the electric actuator 11 to the intake air compressor 4 can be improved.

(Related Technique of Fifth Characteristic Technique)

The magnetic flux generating portion 36 is insert-molded in the resin component that forms the final gear. The magnetic flux generating portion 36 includes two permanent magnets 71, and two yokes 72 made of magnetic metal, and these permanent magnets 71 and the yokes 72 are combined to form a closed magnetic circuit. The two yokes 72 are shaped into arcuate forms, respectively, which have different radii of curvature, and these two yokes 72 are combined.

The type of permanent magnet 71 is not necessarily limited to any particular one and may be, for example, a rare-earth magnet or a ferrite magnet.

The two yokes 72 are iron components that are shaped into the arcuate forms, respectively, which have the different radii of curvature. One end parts of the two yokes 72 clamp one of the permanent magnets 71, and the other end parts of the two yokes 72 clamp another one of the permanent magnets 71.

An arcuate gap δ, into which the magnetic sensing device 37 is inserted, is formed between the two yokes 72. The arcuate gap δ forms an arc that is coaxial with the central axis of the output shaft 23. A gap width between the two yokes 72 is set to be constant in the radial direction. The arcuate gap δ is set such that even when the magnetic flux generating portion 36 is rotated in response to the rotation of the output shaft 23, the magnetic flux generating portion 36 maintains a non-contact state relative to the magnetic sensing device 37.

The two permanent magnets 71 are arranged such that polarities of the two permanent magnets 71 are opposite to each other. Specifically, among the two permanent magnets 71, one permanent magnet 71 has the S-pole that faces the output shaft 23. Furthermore, among the two permanent magnets 71, the other permanent magnet 71 has the N-pole that faces the output shaft 23. With the above-described construction, there is formed the closed magnetic circuit, in which the magnetic flux flows through the one permanent magnet 71, the outer side yoke 72, the other permanent magnet 71, and the inner side yoke 72 in this order.

A portion of the magnetic flux, which is generated at the magnetic flux generating portion 36, passes through the magnetic sensing device 37 inserted into the arcuate gap δ. Specifically, a portion of the magnetic flux of one of the yokes 72 flows into the other one of the yokes 72 through the magnetic sensing device 37. The magnetic sensing device 37 includes a Hall IC that generates a signal, which corresponds to the magnetic flux passing through the Hall IC. Therefore, when the magnetic flux generating portion 36 is rotated in response to the rotation of the output shaft 23, the amount of magnetic flux, which passes through the Hall IC, changes, and thereby the output signal of the magnetic sensing device 37 changes. The ECU 12 obtains an angle of the output shaft 23 based on the signal inputted from the magnetic sensing device 37.

(Advantages)

When the magnetic flux generating portion 36, which forms the closed magnetic circuit, is used, it is possible to make it less susceptible to external magnetic influences, such as magnetic noises, which are applied from the outside. Thereby, the sensing accuracy of the rotational angle sensor 35 for sensing the rotational angle of the output shaft 23 can be improved.

(Sixth Characteristic Technique)

The cover 24 is made of the resin material, as discussed above.

The magnetic sensing device 37 is insert-molded by the resin material of the cover 24.

(Advantages)

Since the magnetic sensing device 37 is insert-molded in the cover 24, the number of components assembled to the housing 20 can be reduced.

Other Embodiments

In the above embodiment, the electric actuator 11 for driving the wastegate valve 9 is exemplified. However, the drive subject of the electric actuator 11 is not necessarily limited to the wastegate valve 9. One specific example is as follows. That is, the electric actuator 11 may drive a flow passage change valve that opens and closes a second exhaust gas scroll provided at the turbine housing 6b. It should be understood that the electric actuator 11 may be used to drive both of the wastegate valve 9 and the flow passage change valve.

In the above embodiment, there is exemplified the case where the present disclosure is applied to the electric actuator 11 that is used for the turbocharger T. Alternatively, the present disclosure may be applied to an electric actuator 11 that is used in a different application, which is different from the turbocharger T.

In the above embodiment, as the specific example of the speed reducing gear device 22, there is described the speed reducing gear device 22 of the parallel shaft type, in which the number of the speed reducing stages is three. The number of the speed reducing stages is not necessarily limited to three and may be changed to be equal to or larger than four. That is, there may be provided a speed reducing gear device that has three or more intermediate shafts.

In the above embodiment, the first recess 61 is the elongated hole, and the second recess 62 is the circular hole. However, the shape of the first recess 61 and the shape of the second recess 62 should not be limited to these shapes and may be changed to any suitable shapes depending on a need. For example, as long as the inner peripheral wall of the first recess 61 contacts the first intermediate shaft 31, and the rotation of the cover 24 about the second intermediate shaft 32 can be limited, the first recess 61 may have another shape, such as a circular hole, an ellipse hole, a polygonal hole, which is other than the elongated hole.

The invention claimed is:

1. An electric actuator comprising:
an electric motor that converts an electric power into a rotational output and outputs the rotational output through a gear of the electric motor;
a housing, in which the electric motor is fixed;
a speed reducing gear device of a parallel shaft type that reduces a rotational speed of the rotational output generated by the electric motor;
an output shaft that is driven by the rotational output, the rotational speed of which is reduced by the speed reducing gear device;
a cover that is assembled to the housing and forms a space between the cover and the housing to receive the electric motor and the speed reducing gear device; and
a housing-side bearing that is placed between the housing and the output shaft and rotatably supports the output shaft relative to the housing; and
a cover-side bearing that is placed between the cover and the output shaft and rotatably supports the output shaft relative to the cover, wherein:
the speed reducing gear device includes a plurality of intermediate shafts that are parallel to the output shaft and are placed between the gear of the electric motor and the output shaft along a transmission path, through which the rotational output of the electric motor is transmitted to the output shaft;
one end portion of each of the plurality of intermediate shafts is fixed to the housing, and another end portion of each of the plurality of intermediate shafts is fitted into a corresponding one of a plurality of recesses formed at the cover;
the cover is positioned relative to the housing by fitting the another end portions of the plurality of intermediate shafts into the plurality of recesses, respectively;
the cover is positioned relative to the housing through use of two of the plurality of recesses, into which two of the plurality of intermediate shafts are respectively fitted;
one of the two of the plurality of recesses is a circular hole while another of the two of the plurality of recesses is an elongated hole;
a longitudinal direction of the elongated hole is along a straight line, which is perpendicular to the two of the plurality of intermediate shafts and extends through the two of the plurality of intermediate shafts; and
a length of the elongated hole, which is measured in the longitudinal direction of the elongated hole, is larger than a width of the elongated hole, which is measured in a direction perpendicular to the longitudinal direction.

2. The electric actuator according to claim 1, wherein the circular hole is provided in the recess that is fitted with a closest one of the plurality of intermediate shafts that is closest to the output shaft among the plurality of intermediate shafts.

3. The electric actuator according to claim 1, wherein:
the electric actuator comprises a rotational angle sensor that senses a rotational angle of the output shaft;
the rotational angle sensor includes:
a magnetic flux generating portion that is rotated integrally with the output shaft; and
a magnetic sensing device that is supported by one of the cover or the housing and senses a magnetic flux generated by the magnetic flux generating portion; and
a gear range, in which a final gear of the speed reducing gear device is placed, and a sensing range, in which the magnetic flux generating portion is placed, are provided separately relative to each other in an area around the output shaft.

4. The electric actuator according to claim 3, wherein:
the cover is made of a resin material; and
the magnetic sensing device is molded in the resin material of the cover.

5. The electric actuator according to claim 1, wherein the elongated hole has two side walls, which are opposed to each other and are parallel to each other, the two side walls extending in the longitudinal direction of the elongated hole, and the corresponding one the two of the plurality of intermediate shafts is positioned between the two side walls.

* * * * *